(No Model.)
E. TUNSTEAD & J. W. MOORE.
MACHINE FOR SLITTING METALLIC LATHING SHEETS.
No. 352,636. Patented Nov. 16, 1886.
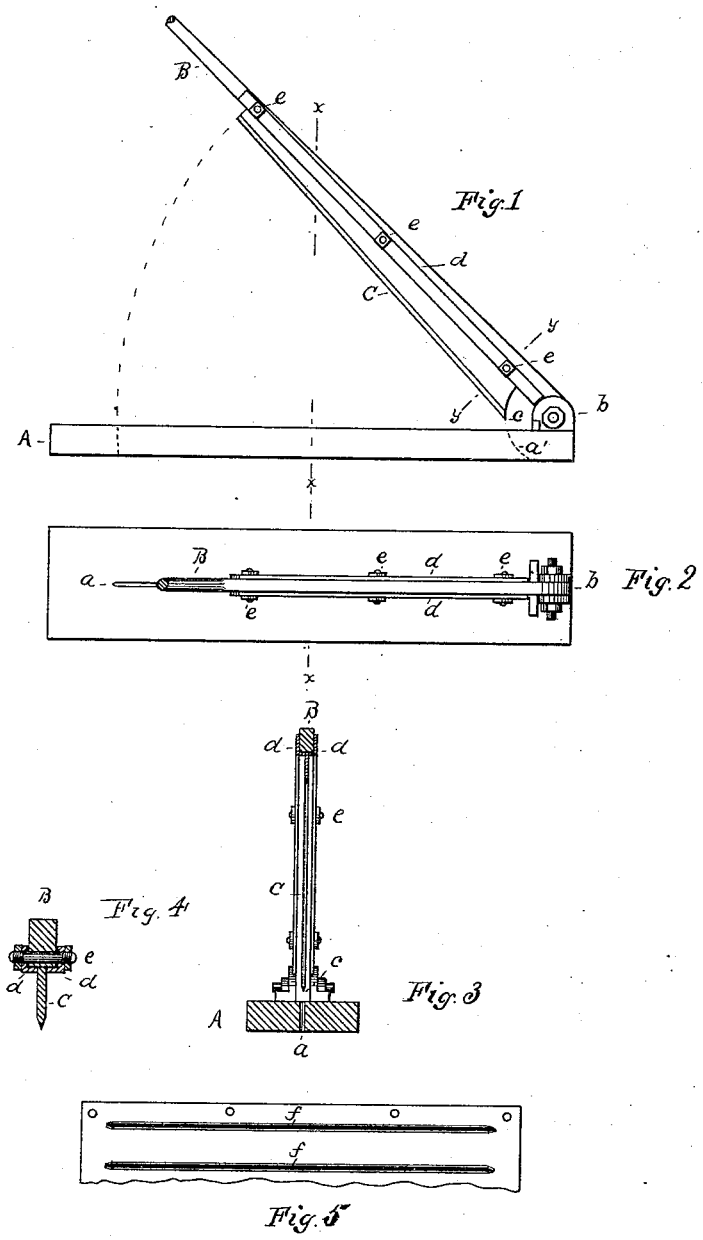
Witnesses:
A. Lewis
C. S. Hamblin
Inventors:
Edward Tunstead
Josiah W. Moore
By P. H. Gunckel
Attorney.

UNITED STATES PATENT OFFICE.

EDWARD TUNSTEAD AND JOSIAH W. MOORE, OF MINNEAPOLIS, MINNESOTA.

MACHINE FOR SLITTING METALLIC LATHING-SHEETS.

SPECIFICATION forming part of Letters Patent No. 352,636, dated November 16, 1886.

Application filed April 13, 1886. Serial No. 198,666. (No model.)

*To all whom it may concern:*

Be it known that we, EDWARD TUNSTEAD and JOSIAH W. MOORE, citizens of the United States, residing at Minneapolis, in the county of Hennepin and State of Minnesota, have invented certain new and useful Improvements in Machines for Manufacturing Metallic Lathing, of which the following is a specification.

Our invention has for its object the preparation of sheets of metal for lathing-sheets for a surface for plastering; and it consists, generally, in blades operating in dies for cutting slits in the metal and bending the edges of the slits to form slots with their edges projecting above the surface of the sheet.

Our invention is illustrated in the accompanying drawings, in which Figure 1 is a side elevation of the machine; Fig. 2, a plan view of the same; Fig. 3, a sectional elevation on the line $xx$ of Figs. 1 and 2. Fig. 4 is a transverse section of the blade and lever on the line $yy$ of Fig. 1, and Fig. 5 shows a portion of a sheet of metal as prepared by the machine for a metallic lathing.

In the drawings, A is a bed-piece, having a longitudinal slot, $a$, to form a die to receive the cutting-blade. At its ends the sides of the slot converge and form angular grooves to conform with the shape of the ends of the cutting-blade.

B is a lever, fulcrumed at $b$ in any suitable manner at one end of the bed-piece, and arranged to turn in line with the slot $a$.

C is a blade, preferably a half-inch or more thick, with a beveled and sharpened cutting-edge, and is clamped between two bars, $d$, and secured to the lever by means of bolts $e$. The lower end of the blade is made concave, and forms a sharp-pointed edge, $c$, for starting the cut in the metal, and the concave shape permits the pointed end of the blade to enter at the end of the slot and follow its course, (indicated by dotted lines $a'$ in Fig. 1,) which is an arc having its axis at the fulcrum $b$.

In operating the machine, a sheet of metal having been placed on the die, the lever is depressed, and the lower point of the blade makes an incision in the metal, and as the lever is further depressed the edge of the blade cuts a slit, while its sides bend the cut edges into the die at nearly right angles to the surface of the sheet. A slot, $f$, is thus formed having its sides standing out from the surface. A series of such slots having been formed at proper intervals, the sheet is ready for use as a lathing-sheet.

In the drawings there is illustrated but one cutting-blade; but it is obvious that a series of blades may be used in connection with a series of dies, and that they may be operated by a common lever, or may be supported in an inclined position between guides and operated by power in any well-known manner.

We make no claim herein for the metallic lathing, but reserve to ourselves the right to make such claim in an application for Letters Patent executed by us of even date herewith.

We are aware of the patent to C. W. Crane, of October 23, 1883, and No. 287,249, for a machine for cutting out narrow strips to form slots in sheet metal, and therefore make no claim for a machine performing such function.

What we claim, and desire to secure by Letters Patent, is—

In a machine for making metallic lathing material, the combination of a bed-plate having an elongated slot with a slitting-blade pivoted at one end to the bed-plate, said blade being less thick than the width of the slot, and having a double-beveled edge, as described, for cutting slits in the sheet of metal and bending the edges of the slits down into the slot.

EDWARD TUNSTEAD.
JOSIAH W. MOORE.

Witnesses:
N. LEWIS,
P. H. GUNCKEL.